United States Patent [19]

Padget et al.

[11] 4,425,465

[45] Jan. 10, 1984

[54] AQUEOUS COATING COMPOSITIONS

[75] Inventors: John C. Padget, Frodsham; Kevin T. McAloon, Appleton Thorn; Anthony J. Burgess, Frodsham, all of England

[73] Assignee: Imperial Chemical Industries PLC, London, England

[21] Appl. No.: 415,543

[22] Filed: Sep. 7, 1982

[30] Foreign Application Priority Data

Sep. 14, 1981 [GB] United Kingdom ............... 8127700

[51] Int. Cl.$^3$ .................... C08K 3/34; C08K 3/10; C08L 27/06; C09D 5/18

[52] U.S. Cl. ................ 524/450; 106/18.11; 106/DIG. 3; 260/DIG. 24; 523/179; 524/492; 524/493

[58] Field of Search .............. 106/DIG. 3, 18.11; 260/DIG. 24; 524/449, 492, 493, 450; 523/179

[56] References Cited

U.S. PATENT DOCUMENTS

| | | | |
|---|---|---|---|
| 3,540,892 | 11/1970 | Lard et al. | 106/18.11 |
| 3,764,456 | 10/1973 | Woodhams | 106/DIG. 3 |
| 3,916,057 | 10/1975 | Hatch et al. | 524/450 |
| 3,970,627 | 7/1976 | Seymus | 524/449 |
| 4,123,401 | 10/1978 | Berghmans et al. | 524/449 |
| 4,305,992 | 12/1981 | Langer et al. | 524/450 |
| 4,325,858 | 4/1982 | Saito et al. | 524/449 |
| 4,385,135 | 5/1983 | Langer et al. | 524/450 |

FOREIGN PATENT DOCUMENTS

| | | | |
|---|---|---|---|
| 2475567 | 8/1981 | France | 524/449 |
| 38-26480 | 12/1963 | Japan | 524/449 |
| 53-31736 | 3/1978 | Japan | 524/449 |
| 615541 | 1/1949 | United Kingdom | 524/449 |
| 1558411 | 1/1980 | United Kingdom | 524/492 |

OTHER PUBLICATIONS

Journal of Applied Polymer Science, vol. 26, pp. 791–797 and 801–808.

*Primary Examiner*—Ronald W. Griffin
*Attorney, Agent, or Firm*—Cushman, Darby & Cushman

[57] ABSTRACT

An aqueous coating composition for the corrosion-protection and/or fire-protection of substrates comprising a dispersion of chemically delaminated vermiculite lamellae in an aqueous solution or dispersion of a film-forming polymeric binder. Preferably the vermiculite lamellae are of size below 50 microns, especially below 20 microns, and the film-forming polymeric binder is in the form of a colloidal dispersion or emulsion of the polymer in water such as is commonly called a latex.

18 Claims, No Drawings

AQUEOUS COATING COMPOSITIONS

This invention relates to aqueous coating compositions comprising an organic polymer and an inorganic filler and to a method for the production of the coating compositions and to use of the coating compositions for improving the corrosion protection and/or fire protection of substrates, particularly metallic substrates such as steel and combustible materials such as wood and organic polymer foams.

Aqueous or water-based coating compositions for use in the protective coating of substrates, for example in the protection of ferrous metals against corrosion or rusting, are well known. The compositions comprise an aqueous solution, or usually an aqueous dispersion (latex), of a polymeric binder (typically an acrylic homopolymer or copolymer), one or more pigments or colouring agents and optionally one or more other components, for example thickening agents. Such coating compositions do not in general impart appreciable corrosion protection to (ferrous) metals even when they contain a corrosion inhibitor such as a pigment, and in general they afford little if any protection of substrates against fire. Coatings derived from compositions wherein the polymeric binder contains a high halogen content, for example vinyl chloride and vinylidene chloride polymers and copolymers of high chlorine content, may afford a degree of corrosion resistance and fire protection to substrates since in general these polymers form coherent barrier coatings which protect metals against corrosion and do not readily burn. However, it is well known that there is considerable room for improvement even of such coatings.

It has been proposed to enhance the fire protection properties of coatings by incorporating non-combustible inorganic materials in the coating compositions. However, whilst inorganic materials may enhance the fire-protection properties of the coating if present in large amounts, the large amounts required for significant effect tend to seriously impair the mechanical properties of the coatings and impair the adhesion of the coatings to the substrates to be coated. Moreover such modified coatings do not generally afford significantly greater corrosion protection of the substrates than do the unmodified coatings.

We have now devised coating compositions containing an inorganic material which provide coatings affording good corrosion resistance and good fire-protection (including heat-resistance) of substrates. The invention resides in conferring improved corrosion and fire-protection properties on coatings derived from aqueous polymer-based coating compositions whilst retaining adequate mechanical properties in such coatings.

According to the present invention there is provided an aqueous coating composition comprising a dispersion of vermiculite lamellae in an aqueous solution or dispersion of a film-forming polymeric binder.

The coating composition may contain one or more other layer minerals in addition to vermiculite lamellae.

The term "vermiculite" is used herein as including all minerals known minerallogically and commercially as vermiculite, including minerals having a proportion of vermiculite layers, for example hydrobiotites and chlorites.

By the term "vermiculite lamellae" we mean tiny particles or flakes of the layer mineral vermiculite obtained by treating vermiculite with chemicals, swelling the treated vermiculite in water and applying shear to the swollen vermiculite particles in water to delaminate the layer mineral and produce an aqueous suspension of tiny particles of the layer mineral. The tiny particles or lamellae are of size below 100 microns and their thickness is less than 1 micron. The particles have a high aspect ratio (length or breadth/thickness) of at least 10, preferably at least 100 and more preferably at least 1,000 for example 10,000. The lamellae are mutually adhesive and are film-forming.

Production of aqueous suspensions or slurries of vermiculite lamellae by treatment of vermiculite particles with one or more aqueous solutions of metal (especially alkali metal) salts or alkyl ammonium salts followed by swelling in water and then milling to delaminate the vermiculite is well known and is described for example in United Kingdom Patent Specifications Nos. 1,016,385; 1,119,305; 1,585,104; and 1,593,382 and in U.S. Pat. No. 4,130,687. Vermiculite lamellae produced by any of the known chemical delamination processes may be incorporated in the coating compositions of the present invention.

Vermiculite lamellae are readily dispersed in water and are readily incorporated in aqueous coating compositions by mixing the components and agitating the mixture, for example by gently stirring, to form the coating composition. Stabilising surface active agents may be added to the mixture to inhibit flocculation of one or more of the components during the mixing operation. Usually the lamellae will be added to the coating composition in the form of an aqueous suspension of the lamellae and in particular in the form of the aqueous suspension resulting from the vermiculite delamination process. However, although the suspension produced in the so-called chemical delamination process may be used directly in forming the coating compositions of the invention, we prefer to incorporate only lamellae of size below about 50 microns and preferably below about 20 microns in the coating compositions. Accordingly we prefer to treat the suspension of lamellae to eliminate all particles of size greater than 50 microns, and preferably all particles of size greater than 20 microns, before the suspension is incorporated in the coating composition. The treatment of suspensions of vermiculite lamellae to eliminate underside large particles is described in our United Kingdom Patent Specification No. 1,593,382, the disclosure of which is incorporated hereby by reference. For use in the coating compositions of the invention we especially prefer that the vermiculite lamellae or at least a major proportion of the vermiculite lamellae (for example at least 60% by weight of the lamellae) have a particle size of less than 5 microns. Thus the especially preferred suspension of vermiculite lamellae contains lamellae of size below 20 microns of which a major proportion of the lamellae are of size below 5 microns.

The amount of vermiculite lamellae incorporated in the coating compositions may vary within wide limits from a few percent (say 2%) up to about 95% by weight based on the weight of the dry solids (including polymer binder) in the composition or, in the case where the composition contains other additives, on the total weight of non-volatile solids in the composition. Preferably the amount of lamellae is from 20% to 80%, especially from 40% to 75%, by weight. The amount will depend to some extent upon the intended use of the coating composition, being in general less for compositions (paints) where corrosion resistance is the prime requirement of the coating, and greater for compositions where fire-protection is important but corrosion resistance is not essential. The optimum amount of vermiculite for any particular use of the composition is readily determined. Surprisingly high loadings of lamellae, for example greater than 50% by weight of the solids in the composition do not seriously impair the mechanical properties of the coatings and in particular the adhesion of the coating to the substrate.

A wide variety of polymers (homopolymers and copolymers) may be used as the film-forming polymeric binder component of the coating composition. Water-soluble polymers may be used, for example polyvinyl alcohol, polyacrylamide, polyvinyl pyrrolidone and polyacrylic or polymethacrylic acids and copolymers thereof, but usually the polymer will be dispersed rather than dissolved in water. Mixtures of water-soluble polymers and water-insoluble polymers may be used such that the coating composition comprises both a solution and a dispersion of polymeric binder components. In the case of water-soluble polymers, especially where the resulting coatings are required to impart corrosion resistance to metals, there is advantageously used a polymer or mixture of polymers which can be rendered water-insoluble after application of the coating composition to the substrate; for instance polymers which can be cross-linked for example by heating and/or use of catalysts may advantageously be employed such that the coating is readily rendered insensitive to water.

We especially prefer a dispersion of the polymer in water, for example a latex. Aqueous emulsions of a solution of the polymer in an organic solvent may be used although we prefer coating compositions which are essentially free from organic solvents, i.e. which contain less than 2% or 3% by weight of an organic solvent.

Polymers which may be used as the film-forming polymer (the "polymeric binder") in aqueous dispersions used in the present invention include homopolymers and copolymers of the following:
vinyl chloride,
vinylidene chloride,
tetrafluoroethylene,
hexafluoropropene,
vinylidene fluoride,
vinyl esters of alkanoic acids having from 1 to 18 carbon atoms in the alkyl group, especially vinyl acetate,
acrylic and methacrylic esters of alkanoic acids having from 1 to 18 carbon atoms in the alkyl group, especially the said esters having from 1 to 12 carbon atoms in the alkyl group, for example the methyl, ethyl, butyl and 2-ethylhexyl esters,
acrylonitrile and methacrylonitrile
mono- and di- ethylenically unsaturated hydrocarbons, for example ethylene, isobutene, styrene, alpha-methyl styrene and aliphatic dienes such as butadiene, isoprene and chloroprene.

The polymers may also (optionally) contain a small proportion of one or more unsaturated polymerizable acids, e.g. aliphatic alpha-beta unsaturated carboxylic acids. The proportion of such acid(s) may be, for example, from 0.2 parts to 70 parts by weight per hundred parts of the total monomer components of the polymer. Acids which may be used include acrylic, methacrylic, itaconic and citraconic acids. Mixtures of polymers may be used if desired.

Polyvinyl acetate and copolymers of vinyl acetate with one or more of vinyl chloride, vinylidene chloride, styrene, acrylonitrile, methacrylonitrile, and one or both of the acrylic and methacrylic acid esters mentioned above may be used. Similarly copolymers of one or more of the acrylic or methacrylic acid esters mentioned above with one or more of vinyl acetate, vinyl chloride, vinylidene chloride, styrene, acrylonitrile, and methacrylonitrile also may be used. Homopolymers of ethylene, isobutylene, and styrene, and copolymers of one or more of these hydrocarbons with one or more esters, nitriles or amides of acrylic acid or methacrylic acid or with vinyl esters, such as vinyl acetate and vinyl chloride, or with vinylidene chloride are also used. The diene polymers are generally used in aqueous based paints in the form of copolymers with one or more of styrene, acrylonitrile, methacrylonitrile, and the above-mentioned esters of acrylic acid or methacrylic acid.

It is also quite common to include a small amount, such as 1 to 5 percent or more, of an acid monomer in the monomer mixture used for making the copolymers of all of the general types mentioned above by emulsion polymerization. Other copolymerizable monoethylenically unsaturated monomers containing about 1 to 10 percent, and preferably 1 to 5 percent, by weight of monomers having a polar group selected from the group consisting of alcoholic hydroxyl, amino and carboxylic acid amide are also useful.

Aqueous dispersions of polymers may be made using one or more emulsifiers of anionic, cationic, or non-ionic type. Mixtures of two or more emulsifiers regardless of type may be used, though it is generally undesirable to mix a cationic with an anionic type in any appreciable amounts.

The polymer may be prepared in situ in an aqueous dispersion by an emulsion polymerization or a suspension polymerization technique, or the dispersion may be prepared by post-emulsification of a pre-formed polymer.

Where fire-protection and flame-retardancy are the prime requirements of the coating, a particularly suitable polymeric binder is derived from a halogen-containing monomer and/or is a halogen-containing polymer or copolymer, e.g. a copolymer of (i) vinyl chloride, (ii) vinylidene chloride and (iii) one or more alkyl acrylates or alkyl methacrylates having from 1 to 12 carbon atoms in the alkyl group; such polymers may optionally also contain one or more aliphatic alpha-beta unsaturated carboxylic acids. Examples of such copolymers are those described generally and specifically in the specification of our United Kingdom Patent Specification No. 1,558,411 and European Patent Publication No. 30080A1.

The coating compositions may contain other additives, for example pigments, thickening agents and corrosion inhibitors, the foamers and dispersants, such as are usually incorporated in aqueous polymer-based coating compositions. As described hereinbefore, the coating composition may contain other layer minerals as well as vermiculite. for example, kaolin (clay) and montmorillonite.

The coating compositions may be applied to a wide variety of substrates including all substrates to which the known compositions are commonly applied. Examples of such substrates are metals (and especially metals such as ferrous metals which are subject to corrosion) and cement and concrete structures. In the case of ferrous metals these may be, for example, clean or rusty steel which has been cleaned by blasting with sand or steel shot or by other means for example wire-brushing. Combustible materials such as wood and flexible and rigid polyurethane and polyisocyanurate foams may usefully be coated with the compositions. The compositions are useful in any applications where it is desired to coat a substrate to impart corrosion resistance or fire protection (which term includes heat-resistance) or both to the substrate.

The coating composition may be applied by conventional coating and painting techniques, for example dipping, brushing, spraying, roller-coating and spreading.

The invention is illustrated by the following examples in which the following general procedure was used to prepare the vermiculite suspensions.

Preparation of vermiculite suspensions 150 parts of vermiculite ore (Mandoval micron grade, ex-South Africa) are agitated with saturated sodium chloride solution in 1:2 ratio by weight in a tank for 30 minutes at 80° C. This suspension is then centrifuged and washed with deionised water. The wet cake is transferred to a second tank where the vermiculite is stirred with 1.5 N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling, the suspension contains approximately 20% solids and the particles are random sized in the range 300-400 micron. This suspension is then passed through a stone-type mill which reduces approximately 50% of the particles to platelets of size less than 50 microns. This milled suspension is classified in a weir-type centrifugal classifier and the lighter particles with sieve size less than say 50 micron are collected for use. Analysis of this suspension by photosedimentometer and disc centrifuge reveals that approximately 40% of the particles have a size ("equivalent spherical diameter") of 0.4-1.0 micron. The solids content of the suspension is readily adjusted by adding water to it or removing water from it.

EXAMPLE 1

An aqueous latex of a copolymer of vinylidene chloride, vinyl chloride, 2-ethylhexyl acrylate and acrylic acid was prepared by the method described in United Kingdom Patent Specification No. 1,588,411. The copolymer contained 70 parts by weight of vinylidene chloride, 22 parts by weight of vinyl chloride, 6 parts by weight of 2-ethylhexyl acrylate and 2 parts by weight of acrylic acid and is available as a 61% solids content latex under the trade name "Haloflex" 202 from Imperial Chemical Industries Limited.

0.880 ammonia solution was added dropwise to the latex (100 g) until the pH of the latex was 8.5. An 18% by weight solids content suspension (1216 g) of vermiculite lamellae in water which had been classified by removal of all particles of size greater than 20 microns was added gradually to the latex which was gently stirred throughout the addition to disperse the vermiculite uniformly throughout the composition. The resulting aqueous coating composition had a total solids content of 21.3% by weight and a vermiculite content of 78% by weight based on the total solids in the composition.

A wooden rod was immersed in the coating composition to coat it with the composition and the coated rod was dried at 25° C. in a ventilated oven for 24 hours to dry the coating. Several coats of the composition were applied in this way. A smooth, continuous, firmly-adhered coating was obtained which contained 78% by weight of vermiculite lamellae based on the weight of the coating.

The tip of the blue region of a flame from a Bunsen burner was applied to the coated wood rod for a period of 3 minutes, during which time the coating expanded and glowed red. At no time during the application of the flame did the coated rod support combustion. After 3 minutes the flame was removed and the coated rod was allowed to cool. The layer of expanded coating at the point where the flame had been applied was still intact but was no longer firmly adhered to the wooden rod. The expanded layer of coating was removed and the exposed wood was examined visually. The exposed area of wood exhibited virtually no sign of charring of the wood.

In a comparative flame test, a wooden rod similar to the first but uncoated ignited after only a few seconds in the flame and burning was continuous during the period of application of the flame and for several seconds after removal of the flame.

In a further comparative flame test, a similar wood rod coated with the same thickness of a coating composition as above but excluding the vermiculite was subjected to the test. Ignition of the sample was not observed but upon removal of the flame after 3 minutes it was noted that surface charring of the wood had occurred.

EXAMPLE 2

An 18% solids content, classified (20 microns), aqueous delaminated vermiculite suspension (1200 g) was added slowly with mixing to an acrylic hydrosol (100 g) of 40% solids content and pH 8.5. The acrylic hydrosol was a colloidal dispersion of an acrylic copolymer in water available under the trade name Elvacite EP 7020 from E I duPont de Nemours Ltd. A stable, fairly viscous slurry was obtained. The vermiculite content of the resulting slurry was 84% by weight based on the total solids in the slurry.

A wooden rod was coated by immersion in the slurry and the coating was dried as described in Example 1. The coated rod was subjected to the flame test described in Example 1. The coating initially supported combustion in the area at and adjacent the point of application of the flame but after approximately 15 seconds combustion ceased and the flame from the coating was extinguished. The Bunsen burner flame was applied for 3 minutes, during which time the coating expanded and became glowing red. The Bunsen flame was then removed and the coated rod was allowed to cool.

The intact expanded coating in the region where the flame had been applied was removed to expose the wood and it was observed that only very slight charring of the surface of the wood had occurred.

By comparison, a similar but uncoated wooden rod ignited after only a few seconds in the Bunsen flame and burning was continuous throughout application of the flame and for several seconds after removal of the flame. By way of comparison also a similar wood rod coated to the same thickness with Elvacite EP 7020 (excluding the vermiculite lamellae) was subjected to the same test. It was observed that burning occurred both during and subsequent to application of the flame to the sample.

EXAMPLE 3

The slurry prepared as described in Example 2 was applied by bar-spreading to a Pyrene mild steel test panel using a No 8 Meyer bar. The coated panel was dried in a well-ventilated oven at 35° C. for 24 hours. A second coating of the slurry was then applied over the first (dried) coating in the same way to provide a final coating of thickness 20 microns and vermiculite content 84% by weight of the dry coating.

To assess the corrosion-protection afforded by the coating, the coated panel was subjected to a salt-spray test conforming to BS 3900 Part F4.

For purposes of comparison, a panel coated with a 20 micron thick coating of Elvacite EP 7020 alone was also subjected to the salt-spray test.

After an exposure of 1000 hours to the salt-spray, the panels were removed and examined. The panel coated with the film containing vermiculite had become stained but had retained its smooth surface appearance with no sign of blister formation. Adhesion of the coating to the mild steel panel was apparently unimpaired. Subsequent detachment of a part of the coating revealed that the mild steel substrate had retained its original shiny, smooth appearance with no visible sign of corrosion. By contrast, the panel coated with the film excluding vermiculite was severely blistered and upon removal of the coating film the surface of the mild steel substrate was seen to be extensively pitted by corrosion.

EXAMPLE 4

A coating composition was prepared as described in Example 1 by incorporating an aqueous slurry of delaminated vermiculite in a "Haloflex" latex. The composition comprised 78% by weight of vermiculite based on the total solids in the composition.

The coating composition was brush-coated onto all surfaces of a 1.5 m×0.5 m×0.015 m slab of a flexible polyurethane foam. The coated slab of foam was dried in an oven at 85° C. for 1 hour. The dry coating weight was 302 g/m². The coated slab was then wrapped completely in a 100% nylon, warp-knitted plush fabric (quality 12) supplied by J Haggos (S Kelmanthorpe).

The coated slab was then folded at an angle of 90° at a point 0.5 m along its length and juxtaposed on a metal wall ready for flammability testing. The slab was tested along the fold according to BS DD58, ignition source 1 (i.e butane gas flow of 45 l min and a gas burn time of 20 seconds). The fold was examined after removal of the flame and pyrolysis was seen to continue for 1 min 55 seconds after which time the flame self-extinguished. This result represents a pass in the test. Examination of the slab after the test revealed local surface pyrolysis; only one third of the front face of the slab had been affected. By contrast, a similar but uncoated slab of the flexible polyurethane foam was virtually completely destroyed in the test.

EXAMPLE 5

Three aqueous coating compositions were prepared by the precedure described in Example 1, containing the following proportions of vermiculite.

| Composition | % w/w Vermiculite* |
| --- | --- |
| A | 78 |
| B | 71 |
| C | 52 |

*based on total solids in the composition, i.e. on the dry weight of the resulting coatings.

The compositions were used separately to coat one side of aluminium samples 15 cm×10 cm×0.1 cm by brush-coating and the coatings were dried in an oven at 85° C. for 1 hour. Coating thicknesses were determined:

|   | Coating thickness |
| --- | --- |
| A | 27 microns |
| B | 20 microns |
| C | 32 microns |

Three thermocouples were attached to each of the coated samples; one at the nearside (coated) centre, one 6 cm from the centre nearside and one at the centre farside (uncoated), nearside and farside referring to the side at which a flame was subsequently applied). A Bunsen burner flame was applied to the nearside centre of each panel with the tip of the blue region of the flame at a distance of 3 cm from the surface of the coating.

After application of the flame for a period of 10 minutes, the temperatures recorded at the various thermocouples had equilibrated and the following temperature differences (°C.) were noted:

| Sample | between centre front and centre back | between centre front and 6 cm from centre front |
| --- | --- | --- |
| A | 490 | 560 |
| B | 485 | 520 |
| C | 435 | 360 |

The results demonstrate the considerable thermal barrier afforded by the compositions and show that the higher the vermiculite content of the compositions, the greater is the temperature difference measured both through the coated aluminium sample and along the coated surface of the sample.

In the flame tests, it was observed that each of the three coated samples exhibited charring after only a few minutes in the flame, but none of the coatings shows signs of significant blister-formation even after 10 minutes.

The flame was applied to the coated samples for a further 10 minutes (total 20 minutes) and even after this time the aluminium substrates had not melted. By contrast, an uncoated aluminium sample of the same size melted in the flame test within a period of 2 minutes.

EXAMPLE 6

An aqueous paint was formulated from the following ingredients by the procedure described below:

| Ingredient | Proportions (by weight) |
| --- | --- |
| Polidene 33-075 latex (55% w/w solids) | 60.2 |
| Zinc phosphate (PZ40) | 5.7 |
| Micronised Red Iron Oxide | 2.6 |

| Ingredient | Proportions (by weight) |
| --- | --- |
| Synperonic PE39/70 (30% w/w aqueous solution) | 10 |
| Foamaster NS | 0.2 |
| Butyl ethoxol | 2.0 |
| Vermiculite slurry (20 microns) (18% w/w aqueous slurry) | 26.4 |
| Ammonium hydroxide solution | (to pH 7.5) |

Polidene 33-075 is a vinylidene chloride-based polymer available from Scott-Bader Limited. Symperonic PE39/70 is a surface active agent. Foamaster NS is a defoaming agent and Butyl ethoxol is a coalescing solvent.

The classified (20 micron) vermiculite slurry was stirred at high speed and to it were added sequentially the Synperonic solution, the iron oxide and the zinc phosphate. The mixture was then stirred at low speed and to it were added the polymer latex, the defoaming agent and the coalescing solvent. Ammonium hydroxide solution was then added until the pH of the paint was 7.5.

The paint was applied by bar-spreading to a Pyrene mild steel test panel and dried at room temperature for 24 hours to give a dry film thickness of 25 microns. A second coating of paint was then applied to the dry panel and allowed to dry for 7 days at room temperature (approx 20° C.).

To assess the corrosion protection afforded by the coating, the coated panel was subjected to a salt spray test conforming to BS 3900 Part F4. After exposure to the salt spray for 1000 hours (at room temperature), the panel was removed for examination. Blistering was rated on the following scale (ASTM D714-56).

Blister Size: Number scale 10-2 (the number 2 indicating the blister size, with the number 10 indicating the number of blisters).

Blister Density: F=Few, M=Medium, MD=Medium dense, D=Dense.

The blister rating was assessed to be 8-MD.

For purposes of comparison, a similar paint was prepared which differed from that described above only in that the Vermiculite was replaced by micronised barytes, the replacement being effected on an equal volume basis. The protection afforded by this paint was assessed as described above. Examination of the panel after salt spray exposure for 1000 hours gave a blister rating of 8-D.

EXAMPLE 7

A block of flexible polyurethane foam of thickness 1.5 cm was covered with a nylon cover which had been coated with the aqueous coating composition described in Example 1. The coating was 44% by weight of the coated nylon fabric.

The draped foam was weighed and floaded at the centre to an angle of 90° to form a small simulated seat and the flame from a butane burner (designed to DD58, i.e. a butane gas flow of 45 ml/min at 25° C.) was applied to it for a period of 20 seconds. The coated cover fabric did not ignite immediately and ignition was observed only after 8 seconds after which time localised spread of flame was observed over a circular area of approximately 10 cm diameter around the point of application of the burner flame. Upon removal of the burner flame, slow sporadic burning was observed for 1 minute 55 seconds after which time burning ceased. The sample was weighed again and it was determined that only a slight loss in weight had resulted from the burning test.

For purposes of comparison the above procedure was repeated but using a nylon cover which had not been coated with the coating composition. In the burn test, this sample ignited immediately on application of the burner flame and the sample burned fiercely. Upon removal of the burner flame the sample continued to burn fiercely and burning continued for more than 2 minutes. The weight of the sample after the test indicated an appreciable loss of material through combination.

EXAMPLE 8

0.91 ammonia solution was added dropwise to 100 g of the "Haloflex" 202 latex described in Example 1 until the pH of the latex was 8.5 An 18.5% by weight aqueous suspension (1183 g) of vermiculite and deionised water (33 ml) were added gradually to the stirred latex to disperse the vermiculite lamellae uniformly throughout the composition. The aqueous coating composition had a vermiculite content of 78% by weight of the total solids in the composition.

A wooden dowel of diameter 1.25 cm was immersed in the coating composition and the coated rod was dried at 25° C. for 24 hours in a ventilated cupboard.

A smooth, continuous, firmly-adherent coating was produced which contained 678% by weight of vermiculite.

The tip of the blue region of the flame from a Bunsen burner was applied to the coated end (single coating) of the wooden dowel.

The coating protected the rod from the flame and when the flame was removed there was no visible evidence of burning on the rod. The flame was re-applied for 3 minutes and then again removed. At no time did the coated rod support combustion. The rod was allowed to cool and was then examined. The coating, though charred, was intact and was still adhered to the wooden rod. The charred coating was removed and examination of the exposed surface of the wood revealed considerable charring of the wood.

In a second experiment, the aqueous coating composition was applied by brushing to the surface of an aluminium panel of size 15 cm×10 cm×0.1 cm, and the coating was dried at 85° C. in an oven for 1 hour. A second coat of the composition was applied and dried in the same manner.

Thermocouples were applied to the panel—one each at the centre on both sides of the panel and the third at a distance of 6 cm from the centre on the coated side of the panel. The panel was then subjected to the flame from a Bunsen burner placed with the tip of the blue region of the flame at a distance of 3 cm from the coated side of the panel. The flame was removed after 20 minutes at which time the aluminium panel was still intact. After the flame had been applied to the coated panel for 10 minutes, the temperatures recorded by the thermocouples were (i) 881° C. at the centre of the coated side of the panel (ii) 405° C. at the centre of the uncoated (back) side of the panel and (iii) 462° C. at a distance of 6 cm from the centre of the coated side of the panel.

EXAMPLE 9

An aqueous latex of pH 8.5 was produced as described in Example 8 and to the stirred latex were added an 18.5% vermiculite suspension (591.5 g) and deionised water (515 g). When the vermiculite lamellae were thoroughly dispersed throughout the latex, Kaolin powder (109.4 g) was added gradually to the stirred composition. The composition was mixed until it was homogeneous.

A wooden rod was coated as described in Example 8 and subjected to the flame from a Bunsen urner. Slight burning of the coated rod was observed but when the flame was removed after 30 seconds burning ceased immediately. The flame was reapplied to the coated rod for a further 30 seconds and then was again removed. Burning did not cease immediately but flame was extinguished within 10 seconds.

An aluminium panel was coated with the composition and exposed to a flame as described in Example 8. After 10 minutes the temperature recorded at the centre of the coated side of the panel was 884° C., the temperature recorded at the centre of the uncoated (back) side was 389° C. and the temperature recorded at a distance of 6 cm from the centre of the coated side was 508° C. The coated panel remained intact throughout the test.

EXAMPLE 10

An aqueous coating composition was prepared and used as described in Example 9 except that bentonite powder (109.4 g) was employed instead of montmoillonite.

In the flame test on the coated wooden rod a very smoky flame was observed but on removal of the Bunsen flame after 30 seconds there was no visible sign of flaming or burning on the coated rod. The Bunsen flame was re-applied for a further 30 seconds and this time after the Bunsen flame ws removed the coated road carried a small residual flame which however was extinguished within 5 seconds.

In the flame test on the coated aluminium panel, the temperature recorded after 10 minutes at the centre of the coated side of the panel was 880° C., the temperature recorded at the centre of the uncoated (back) side was 385° C. and the temperature 6 cm from the centre of the coated side was 503° C. The coated panel remained intact throughout the test.

EXAMPLE 11

Polyvinylalcohol (30.5 g) was dissolved in deionised water (100 g) using a Silverson mixer and then Cymel 303 (3.1 g) and Cycat (0.02 g) were added to the stirred polymer solution. The solution was transferred to a Kenwood food mixer and an aqueous vermiculite suspension (773.3 g–10.95 g vermiculite) was added gradually to the stirred solution.

The resulting Aqueous coating composition was used to coat a wooden rod and an aluminium panel and the coated articles were fire-tested as described in Example 8.

In the flame test, the coated wooden rod did not ignite during application of the Bunsen flame after 3 minutes the coated rod exhibited no visible sign of flaming or burning.

In the flame test on the coated aluminium panel, the temperature recorded after 10 minutes at the centre of the coated side of the panel was 858° C., the temperature recorded at the centre of the uncoated (back) side of the panel was 326° C. and the temperature recorded at a distance of 6 cm form the centre of the coated side of the panel was 460° C. The coated panel remained intact throughout the test.

We claim:

1. An aqueous coating composition comprising a dispersion of an inorganic material in an aqueous solution or dispersion of a film-forming polymeric binder, characterised in that the inorganic material comprises vermiculite in the form of lamellae obtained by treating vermiculite with chemicals, swelling the treated vermiculite in water and applying shear to the swollen vermiculite in water to produce an aqueous suspension of tiny particles of thickness less than 1 micron.

2. An aqueous coating composition as claimed in claim 1 characterised in that the vermiculite lamellae are of size below 50 microns.

3. An aqueous coating composition as claimed in claim 1 or 2 characterised in that the vermiculite lamellae are of size below 20 microns.

4. An aqueous coating composition as claimed in claim 3 characterised in that the major proportion of the vermiculite lamellae are of size below 5 microns.

5. A coating composition as claimed in claim 1 wherein the inorganic material comprises a mixture of vermiculite and one or more other layer minerals.

6. A coating composition as claimed in claim 1 wherein the amount of the vermiculite lamellae is up to 95% by weight based on the total weight of solids in the composition.

7. A coating composition as claimed in claim 6 wherein the amount of the vermiculite lamellae is from 20% to 80% by weight based on the total weight of solids in the composition.

8. A coating composition as claimed in claim 1 wherein the film-forming polymeric binder is in the form of a dispersion of the polymeric binder in water.

9. A coating composition as claimed in claim 1 wherein the film-forming polymeric binder is a copolymer of vinyl chloride, vinylidene chloride and one or more alkyl acrylates or alkyl methacrylates having from 1 to 12 carbon atoms in the alkyl group.

10. A coating composition as claimed in claim 9 wherein the copolymer is also of one or more aliphatic alpha-beta unsaturated carboxylic acids.

11. A coating composition as claimed in claim 1 which contains a stabilising surface active agent to inhibit flocculation of one or more of the components of the composition.

12. A method for the production of an aqueous coating composition which comprises incorporating an inorganic material in a solution or dispersion of a film-forming polymeric binder characterised in that the inorganic material is vermiculite in the form of lamellae obtained by treating vermiculite with chemicals, swelling the treated vermiculite in water and applying shear to the swollen vermiculite in water to produce an aqueous suspension of tiny particles of thickness less than 1 micron.

13. A method as claimed in claim 12 wherein the vermiculite lamellae are added in the form of an aqueous suspension to a solution or dispersion of the film-forming polymeric binder.

14. A method as claimed in claim 13 wherein prior to addition to the solution or dispersion of the polymeric binder, the suspension of vermiculite lamellae is treated to eliminate from it all particles of size greater than 50 microns.

15. Use of the coating composition claimed in claim 1 for imparting corrosion-protection and/or fire protection to substrates.

16. An article comprising a substrate having thereon a coating derived from a composition as claimed in claim 1.

17. An article as claimed in claim 16 wherein the substrate is a metallic substrate.

18. An article as claimed in claim 16 wherein the substrate is an organic foam.

* * * * *